(12) United States Patent
Steiner et al.

(10) Patent No.: US 10,719,782 B2
(45) Date of Patent: Jul. 21, 2020

(54) CHEMICAL EOR MATERIALS DATABASE ARCHITECTURE AND METHOD FOR SCREENING EOR MATERIALS

(71) Applicant: International Business Machines Corporation, Armonk, NY (US)

(72) Inventors: Mathias B. Steiner, Rio de Janeiro (BR); Ronaldo Giro, Rio de Janeiro (BR); Rodrigo Neumann Barros Ferreira, Rio de Janeiro (BR); Romulo de Carvalho Magalhaes, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 15/974,854

(22) Filed: May 9, 2018

(65) Prior Publication Data
US 2019/0347568 A1    Nov. 14, 2019

(51) Int. Cl.
| | |
|---|---|
| *E21B 43/16* | (2006.01) |
| *E21B 43/25* | (2006.01) |
| *G06N 20/00* | (2019.01) |
| *E21B 49/00* | (2006.01) |
| *E21B 49/08* | (2006.01) |
| *E21B 41/00* | (2006.01) |
| *G06F 3/0482* | (2013.01) |

(52) U.S. Cl.
CPC ......... *G06N 20/00* (2019.01); *E21B 41/0092* (2013.01); *E21B 43/16* (2013.01); *E21B 49/00* (2013.01); *E21B 49/08* (2013.01); *E21B 2049/085* (2013.01); *G06F 3/0482* (2013.01)

(58) Field of Classification Search
CPC ....... E21B 41/0092; E21B 43/16; E21B 43/25
See application file for complete search history.

(56) References Cited

U.S. PATENT DOCUMENTS

| | | |
|---|---|---|
| 7,707,013 B2 | 4/2010 | Valdez et al. |
| 7,784,539 B2 | 8/2010 | Montaron |
| | (Continued) | |

OTHER PUBLICATIONS

Bryant, Peter W., et al., "Cognitive Screening of EOR Additives", U.S. Appl. No. 15/469,874, filed Mar. 27, 2017, 28 pgs.

(Continued)

*Primary Examiner* — Catherine Loikith
(74) *Attorney, Agent, or Firm* — Harrington & Smith

(57) ABSTRACT

A method includes: performing a machine learning process using information for enhanced oil recovery (EOR) materials to be used for an EOR process on a defined oil reservoir; determining EOR materials suitable for a condition of the oil reservoir; listing the EOR materials; and outputting an indication of the EOR materials. The materials comprise a first complex fluid to be introduced into the oil reservoir. Determining the EOR materials suitable for the condition is based on similarities between a first set of vector values for the first complex fluid, a second set of vector values for a second complex fluid already in the oil reservoir, and geological data, each of the vector values of the first set being defined by parameters of the first complex fluid and each of the vector values of the second set being defined by parameters of the second complex fluid and the geological data.

20 Claims, 11 Drawing Sheets

(56) References Cited

U.S. PATENT DOCUMENTS

| | | | |
|---|---|---|---|
| 7,966,164 | B2 | 6/2011 | Valdez et al. |
| 8,046,314 | B2 | 10/2011 | Graf et al. |
| 8,175,751 | B2 | 5/2012 | Thakur et al. |
| 8,204,693 | B2 * | 6/2012 | Briers .................... E21B 43/16 702/12 |
| 8,311,743 | B2 | 11/2012 | Gurpinar |
| 8,589,130 | B2 | 11/2013 | Stukan et al. |
| 9,310,285 | B1 | 4/2016 | Avouris et al. |
| 10,344,584 | B2 * | 7/2019 | Anisur Rahman ..... E21B 43/25 |
| 10,577,907 | B2 | 3/2020 | Conn |
| 2012/0053920 | A1 | 3/2012 | Rai et al. |
| 2012/0150519 | A1 | 6/2012 | Bang et al. |
| 2012/0330553 | A1 | 12/2012 | Mollaei et al. |
| 2014/0067347 | A1 | 3/2014 | Gurpinar et al. |
| 2015/0284811 | A1 | 10/2015 | Knight |
| 2016/0063150 | A1 | 3/2016 | Safonov |
| 2017/0174978 | A1 | 6/2017 | Giro et al. |
| 2017/0286802 | A1 * | 10/2017 | Mezghani ............... E21B 49/02 |
| 2018/0202264 | A1 | 7/2018 | Sarduy |
| 2018/0252076 | A1 * | 9/2018 | Bryant ................ E21B 41/0092 |
| 2018/0363031 | A1 | 12/2018 | Becares |

OTHER PUBLICATIONS

Kamari, Arash, et al., "Efficient screening of enhanced oil recovery methods and predictive economic analysis", Neural Comput. & Applic., Feb. 2014, 10 pgs.

Kang, Pan-Sang, et al., "Screening Criteria and Considerations of Offshore Enhanced Oil Recovery", Energies, Jan. 2016, 19 pgs.

Taber, J.J., et al., "EOR Screening Cireteria Revisited—Part 1: Introduction to Screening Criteria and Enhanced Recovery Field Projects", SPE Reservoir Engineering, Aug. 1997, pp. 189-198.

Taber, J.J., et al., "EOR Screening Criteria Revisited—Part 2: Applications and Impact of Oil Prices", SPE Reservoir Engineering, Aug. 1997, pp. 199-205.

Aladasani, Ahmad, "Updated EOR screening criteria and modeling the impacts of water salinity changes on oil recovery", Missouri S&T, 2012, 260 pgs.

Negin, Chegenizadeh, et al., "Most common surfactants employed in chemical enhanced oil recovery", Petroleum 3, 2017, pp. 197-211.

Siena, Martina, et al., "A Novel EOR Screening Approach Based on Bayesian Clustering and Principal Component Analysis", SPE, 2016, 29 pgs.

Moreno, Jaime, et al., "EOR Advisor System: A Comprehensive Approach to EOR Selection", IPTC-17798-MS, 2014, 13 pgs.

Ambrosio, Jacquelyn (editor), "Handbook on Oil Production Research", Nova Science Publishers, Inc., 2014, 20 pgs.

Trujillo, M., et al., "Selection Methodology for Screening Evaluation of Enhanced-Oil-Recovery Methods", SPE, 2010, 11 pgs.

Zhang, Qi-Qi, et al., "Novel Zwitterionic Surfactant Derived from Castor Oil and Its Performance Evaluation for Oil Recovery", Colloids and Surfaces A: Physicochemical and Engineering Aspects, 2015, 42 pgs.

* cited by examiner

COMPLEX FLUIDS SHORTLIST:

| MATERIAL 1 | MATERIAL 2 | RECOVERY | POROSITY | HIGH RISK | LOW RISK |
|---|---|---|---|---|---|
| 0.050 S000113 | 0.150 S000114 | 34.79 | 24.71 | 2 | 2 |
| 0.050 S000112 | 0.150 S000115 | 32.96 | 20.22 | | |
| 0.125 S000113 | 0.375 S000114 | 34.34 | 36.65 | 3 | 1 |
| 0.250 S000113 | 0.750 S000114 | 35.01 | 21.02 | 1 | 3 |
| 0.750 S000113 | 2.250 S000114 | 34.19 | 19.84 | | |

The 0.150 in MATERIAL 2 column is circled and labeled "WEIGHT PERCENTAGE".

FIG.8

COMPLEX FLUIDS SHORTLIST:

WEIGHT PERCENTAGE

| MATERIAL 1 | MATERIAL 2 | MATERIAL 3 | MATERIAL 4 | RECOVERY | HIGH RISK | LOW RISK |
|---|---|---|---|---|---|---|
| 0.14 P000105 | 1.1 S000100 | 0.567 P000106 | 0.333 F000100 | 70 | | |
| 0.14 P000105 | 1.3 S000100 | 0.441 P000106 | 0.259 F000100 | 77 | 1 | 2 |
| 0.14 P000105 | 1.4 S000100 | 0.6 P000106 | | 35 | | |
| 0.14 P000105 | 2.0 S000100 | 0.4 P000106 | 0.1 F000100 | 77 | 2 | 1 |
| 0.14 P000105 | 1.5 S000100 | 0.7 P000106 | 0.1 F000100 | 73 | | |
| 0.14 P000105 | 1.2 S000100 | 0.9 P000106 | 0.1 F000100 | 76 | 3 | 3 |
| 0.14 P000105 | 1.0 S000100 | | 0.1 F000100 | 72 | | |

CHEMICAL EOR MATERIALS DATABASE ARCHITECTURE AND METHOD FOR SCREENING EOR MATERIALS

BACKGROUND

The exemplary embodiments described herein relate generally to enhanced oil recovery (EOR) additives and, more specifically, to EOR materials databases and listings of such materials based on specific oil reservoir conditions.

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section. Abbreviations and acronyms used in this document and/or the drawings are defined below, prior to the claims.

Primary and secondary oil recovery typically extracts no more than 10% to 40% of the original-oil-in-place (OOIP). Since most of the oil reservoirs are becoming older, tertiary methods called Enhanced Oil Recovery (EOR) methods have started to be employed to extract the remaining oil from the reservoir. For instance, as of 2015, it has been reported that a total of 456 cases of successful EOR applications (where 437 were onshore and 19 were offshore) occurred.

There are a number of different techniques for EOR, including chemical, gas, and thermal EOR. Some techniques utilize methods and processes for successful EOR for onshore and offshore applications. Such EOR methods or processes could include polymer flooding, surfactant flooding, alkaline flooding, nanoparticle flooding, or a combination of these, such as ASP (alkaline, surfactant, and polymer flooding).

Such EOR methods or processes, however, are generally implemented without use of a chemical EOR materials database that associates (i) oil reservoir conditions; (ii) any chemical EOR cocktails used; and/or (iii) EOR effectiveness obtained. Furthermore, such methods or processes generally lack any method of recommendation of the chemical EOR cocktails for a specific oil reservoir condition. In particular, methods currently in use generally lack the displaying of materials and/or concentrations of the materials to an operator of the system.

BRIEF SUMMARY

In accordance with one aspect, a method comprises: performing a machine learning process using one or more sources of information for enhanced oil recovery (EOR) materials to be used for an EOR process on a defined oil reservoir; determining one or more EOR materials suitable for a specific condition of the defined oil reservoir; listing the one or more EOR materials suitable for the specific condition; and outputting an indication of the one or more EOR materials and their corresponding concentrations to be used in the EOR process. The EOR materials comprise a first complex fluid to be introduced into the defined oil reservoir. Determining the one or more EOR materials suitable for the specific condition is based on similarities between a first set of vector values for the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

In accordance with another aspect, a computer system comprises; one or more memories having computer readable code; one or more processors, where the one or more processors, in response to retrieving and executing the computer readable code, cause the computer system to perform the following: performing a machine learning process using one or more sources of information for enhanced oil recovery (EOR) materials to be used for an EOR process on a defined oil reservoir; determining one or more EOR materials suitable for a specific condition of the defined oil reservoir; listing the one or more EOR materials suitable for the specific condition; and outputting an indication of the one or more EOR materials and their corresponding concentrations to be used in the EOR process. The EOR materials comprise a first complex fluid to be introduced into the defined oil reservoir. Determining the one or more EOR materials suitable for the specific condition is based on similarities between a first set of vector values comprising the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data:

In accordance with another aspect, a computer program product comprises a computer readable storage medium having program instructions embodied therewith, the program instructions executable by a computer system to cause the computer system to perform operations comprising: performing a machine learning process using one or more sources of information for enhanced oil recovery (EOR) materials to be used for an EOR process on a defined oil reservoir; determining one or more EOR materials suitable for a specific condition of the defined oil reservoir; listing the one or more EOR materials suitable for the specific condition; and outputting an indication of the one or more EOR materials and their corresponding concentrations to be used in the EOR process. The EOR materials comprise a first complex fluid to be introduced into the defined oil reservoir. Determining the one or more EOR materials suitable for the specific condition is based on similarities between a first set of vector values comprising the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein:

FIG. 8 is a table showing various risks associated with various compositions of EOR materials for a first use scenario; and FIG. 9 is a table showing various risks associated with various compositions of EOR materials for a second use scenario.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

In order to provide technological context, conventional techniques include screening only of EOR processes. Although these screening techniques rank possible EOR methods, they do not advise the best EOR materials (also referred to as EOR additives) for each of the EOR processes and do not correlate a material's properties that are responsible for the effectiveness of oil/gas recovery. Thus, one is not able to understand and then to improve those properties when designing new EOR materials. In particular, conventional techniques lack a method for screening EOR materials instead of just EOR processes.

Methods for the screening of EOR additives instead of just the EOR process may be able to correlate a material's properties that may be important to the effectiveness of oil/gas recovery. Advantages of such methods may include: 1) correlating an EOR material's properties that are important to the effectiveness of oil/gas recovery; 2) knowing which material properties are relevant for a specific reservoir condition in order to improve those properties and then design new improved EOR materials; and/or 3) improving the design of new materials and at the same time decreasing the time and cost of development.

Figure 1A:
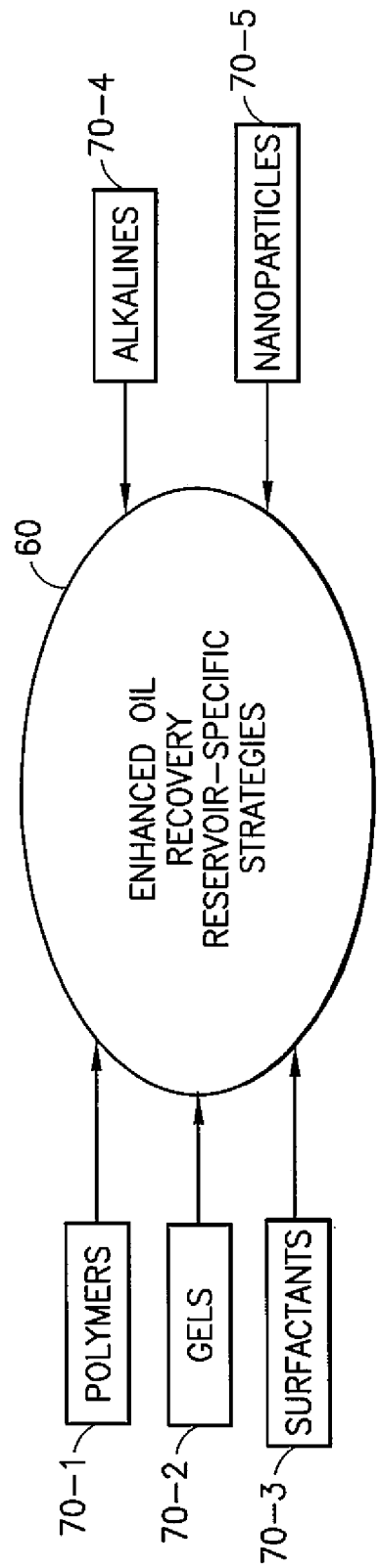
FIG. 1A is an illustration of multiple EOR materials useful for EOR reservoir-specific strategies for a specific reservoir.

Referring to FIG. 1A, there are many EOR techniques and strategies that employ different types of EOR materials 70, such as polymers (also called polymer flooding) 70-1, gels 70-2, surfactants 70-3, alkalines 70-4, and nanoparticles 70-5. Defining an EOR strategy (from the EOR reservoir-specific strategies 60 in FIG. 1A) that is suitable for a specific reservoir may be useful. Even within a class of materials 70, there are still an almost infinite number of possibilities to define a suitable material for a specific reservoir. For example, for polymers 70-1, a decision should be made as to which kinds of polymers are suitable among an enormous combination of physical, chemical, and topological characteristics, such as chemical composition, glass transition temperature, melting point, degradability, polymer chain characteristics (for example, linear/non-linear, homopolymer/copolymer, organic/inorganic), and the like.

Use of a cognitive strategy or platform (for example, based on artificial intelligence methods, machine learning and/or human feedback) could help in screening EOR materials that are suitable for a specific oil reservoir. Furthermore, this strategy could improve the design of new materials and at the same time decrease the time and cost of development. This strategy could establish which material properties are responsible to the effectiveness of EOR. Thus, based on exploration of the properties, improvements may be possible.

Figure 1B:
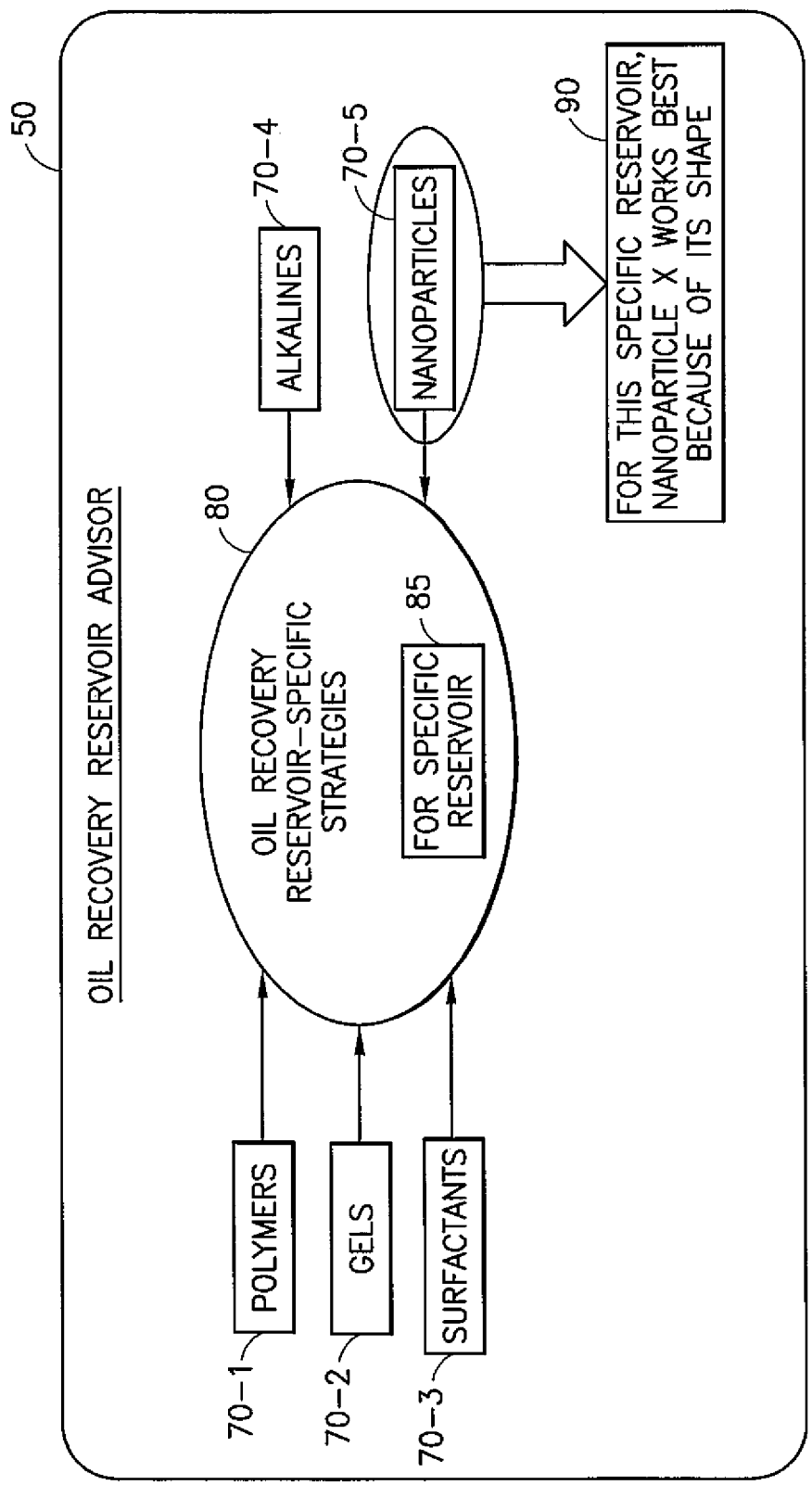
FIG. 1B is an illustration of selecting one of the multiple EOR materials useful for EOR reservoir-specific strategies, based on an exemplary embodiment.

Referring to FIG. 1B, for a specific EOR strategy that employs materials (polymer flooding, hydrogels, surfactants, alkalines, and nanoparticles), the cognitive platform may allow for the selection of a material or a set of materials suitable for a specific oil reservoir and at same time learn what kinds of material properties are important to the effectiveness of oil/gas recovery. In this way, it may be possible to develop new materials while spending less time doing so.

Still referring to FIG. 1B, the EOR materials 70 are applied to a specific oil reservoir 85 in the EOR reservoir-specific strategies 80, as performed using an oil recovery reservoir advisor 50. As indicated by reference 90, for this specific reservoir 85, the nanoparticles 70-5 work best as per the cognitive platform as an EOR material 70. More specifically, the nanoparticle X works best because of its shape. Once this is determined, the options to proceed include using nanoparticle X or designing new nanoparticle shapes based on what the system has discovered.

The exemplary embodiments disclosed herein are intended to overcome the shortcomings of existing platforms. In particular, the exemplary embodiments disclosed herein encompass an enhanced oil recovery reservoir Advisor that employs an EOR materials database architecture in conjunction with methods for the screening of EOR additives (EOR materials) instead of just a recommendation of an EOR process. The structures and methods described herein, in addition to using a set of sensors deployed at an oil well or in the field to monitor physical parameters (flows, temperature, pressure, oil viscosity, water salinity, pH, oil/water saturation) and using an EOR materials database together with Artificial Intelligence (AI) techniques, such as machine learning, neural network models, principal component analyses, and the like, screen the EOR additives and provide a list of materials for specific oil reservoir conditions. Furthermore, the EOR materials database architecture and methods with the Advisor may direct actuators to provide the materials to the reservoir and/or mix them together.

Figure 2A:
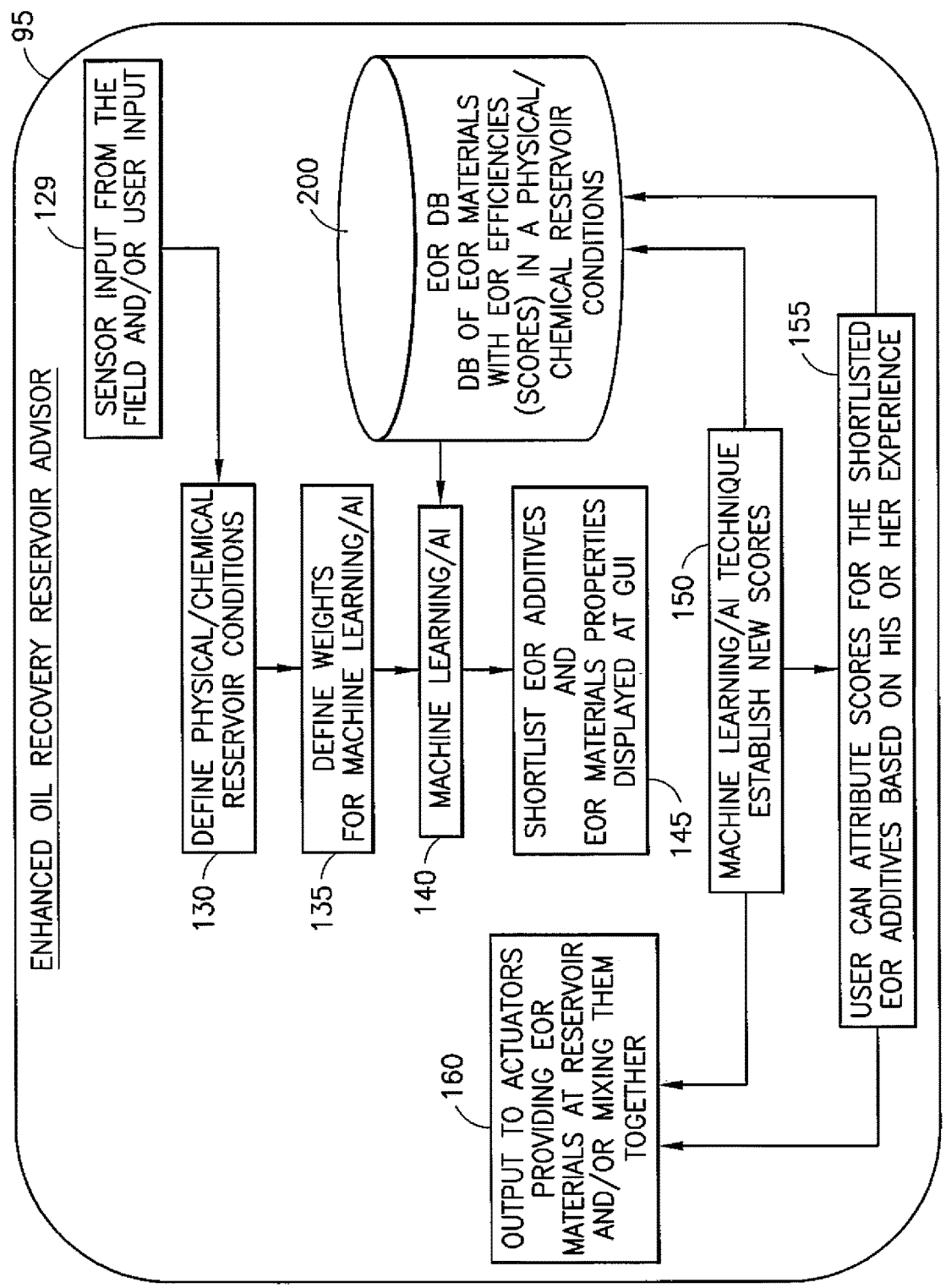
FIG. 2A is a logic flow diagram for operations performed by or using an enhanced oil reservoir advisor, and illustrates the operation of an exemplary method or methods, a result of execution of computer program instructions embodied on a computer readable memory, functions performed by logic implemented in hardware, and/or interconnected means for performing functions in accordance with exemplary embodiments.
Figure 2B:
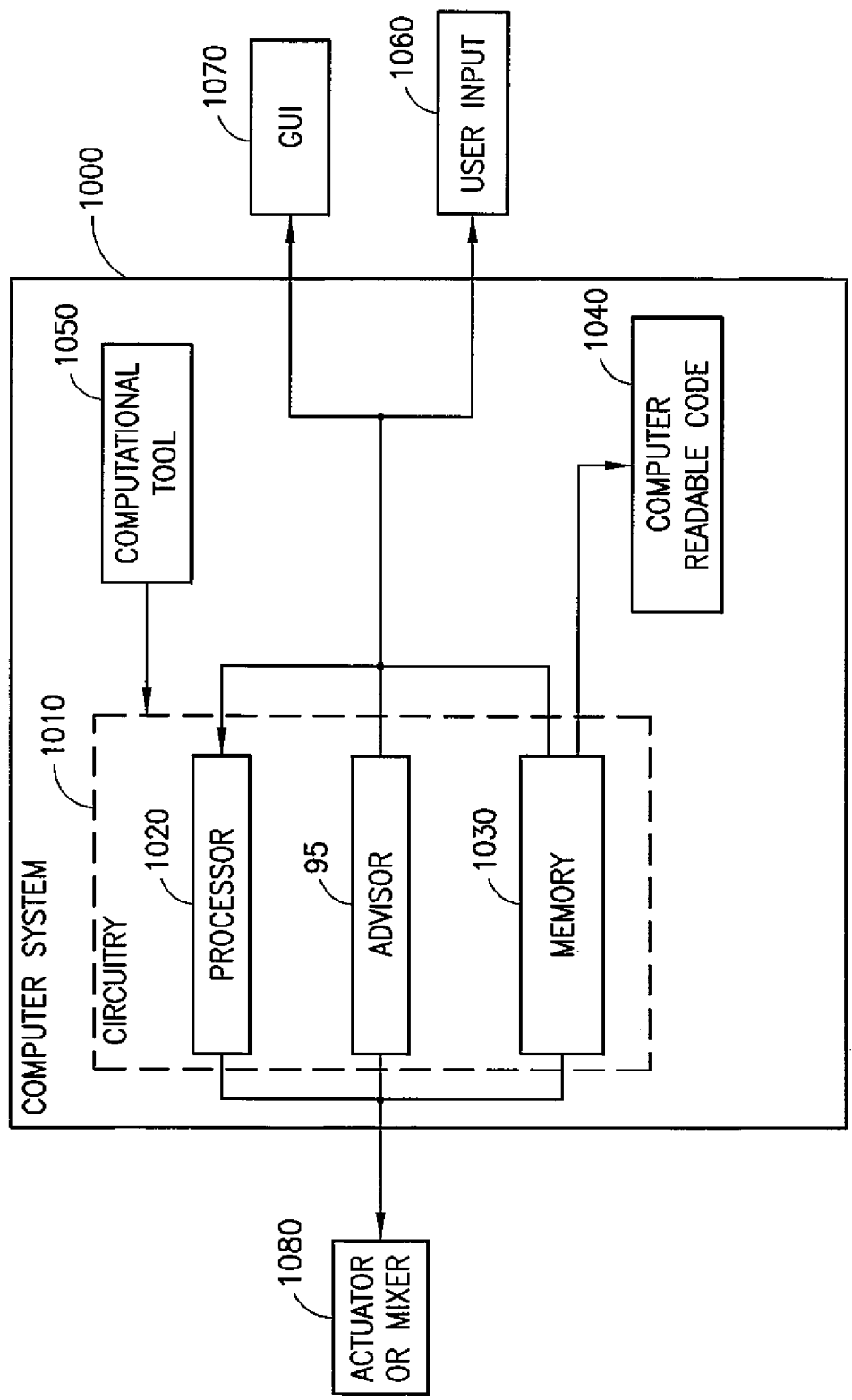
FIG. 2B is a block diagram of one possible internal configuration of the elements of a system using the EOR reservoir advisor in FIG. 2A.

Referring now to FIGS. 2A and 2B, a logic flow diagram for operations performed by or using an Enhanced Oil Recovery Materials Database and an Artificial Intelligence Recommendation System to screen EOR additives and to produce an indication to an operator selecting EOR material combinations in order to maximize oil recovery is shown.

This may be carried out by an Enhanced Oil Recovery Reservoir Advisor, shown generally at 95 and hereinafter referred to as "Advisor 95." The logic flow diagram illustrates the operation of an exemplary method or methods, a result of execution of computer program instructions embodied on a computer readable memory, functions performed by logic implemented in hardware, and/or interconnected means for performing functions in accordance with exemplary embodiments based on database architecture and methods for the screening of the EOR materials.

As shown in FIG. 2B, Advisor 95 may be part of a computer system 1000 having circuitry 1010 with one or more processors 1020 and associated memories 1030. The memory 1030 may include computer readable code 1040, which when accessed and executed by the one or more processors 1020, causes the computer system 1000 to perform the operations described herein, such as those described in the Figures. The Advisor 95 may be implemented in whole or part in the circuitry 1010, which itself may implement the one or more memories 1030 and the one or more processors 1020. For instance, the Advisor 95 may be implemented in an integrated circuit or as part of a programmable logic device. A computational tool 1050 may be associated with the circuitry 1010 to facilitate searching of the World Wide Web using keywords selected by the user. The computational tool 1050 may include an information extraction (IE) tool, where IE is the task of automatically extracting structured information from unstructured and/or semi-structured machine-readable documents. User input to the computer system 1000 may be received through a user input device 1060, and output may be provided to the user via a display such as a graphical user interface (GUI) 1070. Using the Advisor 95, actuators 1080 may be directed to provide the materials to the reservoir and/or to mix them together.

Referring to both FIGS. 2A and 2B, Advisor 95 provides more than just a recommendation of an EOR process. One advantage of the Advisor 95 is that a materials database associates oil reservoir conditions with a chemical EOR cocktail used and with a specific concentration and further with an EOR effectiveness obtained. Another advantage is the implementation of a method to shortlist EOR materials for a specific reservoir condition. Still another advantage is that there is no need to specify an EOR method such as polymer flooding, surfactant flooding, alkaline flooding, or nanoparticle flooding. The Advisor 95 and method is also able to recommend a cocktail which can be, in principle, a mix of polymers, surfactants, nanoparticles, and generic material, or only one type of material.

As shown in FIG. 2A, the user and/or a set of sensors deployed in the field (such as at the oil well), as indicated at block 129, may help to define the physical/chemical reservoir conditions, such as rock type formation (lithology), temperature, pressure, permeability, rock topology information, fluid properties such as oil viscosity, water salinity, pH, oil/water saturation, and the like. This defining occurs in block 130.

The user defines (block 135) weights based on the importance of score types, to be used in machine learning (ML)/artificial intelligence (AI). For instance, for each EOR additive A from the EOR additive Data Base (EOR DB 200), there may be, in an exemplary embodiment, 5 (five) scores associated with the information source's individual effectiveness under specific physical/chemical conditions for a reservoir. The five score types may relate the effectiveness based on the following sources of information: (i) World Wide Web (WWW) search analyses; (ii) microfluidics experiments; (iii) physically driven computational simulation, (iv) AI analyses (such as those described below, for example, in reference to block 140); and (v) user feedback. In this way, the machine learning (AI technique) can be trained based on a specific score source, or on multiple sources, each with specific weighting. The weights and the scores can be the same, but usually they are not the same. The idea is to associate different weights for different score's sources based on how trustable are the scores. For example, scores that come from microfluidic experiments should have greater weights than scores from WWW search analyses. Therefore, weights would then be applied to the scores accordingly.

Upon receiving input from both the user-defined block 135 and the EOR DB 200, the machine learning in block 140 will screen possible EOR additives that are suitable for the reservoir conditions. Concerning machine learning (ML) and AI, these terms are used interchangeably in this document. Depending on what definitions are used, ML may be a subset of AI or may be a discipline separate from but related and similar to the discipline of AI. For instance, it is believed that AI is the broad definition of any learning that is performed by a machine. In that sense, machine learning is a subset of AI. But in the literature, some authors refer to ML as being synonymous with AI. Because of this possible confusion, in this document, ML and AI are any learning that is performed by a machine in order to perform non-human decision making (that is, decision making not performed by a human although possibly using human input). Such learning may use statistical and/or probabilistic techniques and/or evolutionary techniques, symbolic processing, formal logic, expert systems, and the like, including combinations of these.

The EOR DB 200 is a database of EOR materials with corresponding EOR efficiencies in physical/chemical reservoir conditions. As used herein, the terms EOR efficiencies and scores are considered to be interchangeable. The EOR efficiencies are directly related with the increase of oil production due to the addition of the EOR materials. The scores could be the same, or something proportional to the EOR efficiencies (for example, a percentage of the increased oil production). Additionally, while EOR efficiency is typically in terms of production, other types of efficiencies (such as cost) may be considered.

The EOR DB 200 may implement a set of different types of material that may be used in a mix to represent both the fluid being pumped into the reservoir as well as the fluid already inside. The EOR DB 200 may also store log data, either from a simulator, from experimental results, or from the field itself. Furthermore, the EOR DB 200 may store the provenance of each item (material, fluid, log) to support the decision of the machine learning (for example, artificial intelligence technique(s)) in block 140 to support the decision of the Advisor 95 and to allow the user to filter and choose a confidence level when getting recommendations or browsing data.

The materials implemented in the EOR DB 200 are the mix of polymers, surfactants, nanoparticles, and generic material, or only one type of material. The generic material can be used to represent any other material used or present in the reservoir including, but not limited to, liquids and gases. The fluid that is injected or is already in the reservoir is represented by a composition of a number of materials, their types, and their percentages (weight concentration). The fluid already inside the reservoir may, for example, contain a percentage of oil, a percentage of water, a percentage of gas, and/or a percentage of salt, all as the generic material totaling 100%.

Based on an output of the Advisor 95, the user would be able to obtain one or more recommendations upon providing reservoir data and defining weights based on the various provenances and the confidence level to be used. The obtained recommendations may range from a more conservative recommendation (where the result is more certain) to a recommendation that involves more risk (where the result is better but less certain). Subsequently, the user could choose one or more of the obtained recommendations to run a computer simulation and/or a physical simulation (for example, in a laboratory or pilot plant). More complete data provided generally results in a better recommendation. The Advisor 95 may generally require a minimum threshold of data to make the recommendation(s) nonetheless.

Based on the results of the machine learning in block 140, EOR additives suitable for a specific reservoir condition are determined and shortlisted, as indicated at block 145. Block 140 uses information from the EOR DB 200 and the defined weights. At the same time, the EOR additive material properties may be displayed (block 145), possibly on the GUI 1070 (FIG. 2B), which relate to the EOR additive effectiveness. For example, for polymer flooding, the melting point of the selected polymer, chain length, and/or chain topology (linear, branch, star, homopolymer/copolymer, and the like) may be parameters. These parameters are useful to design new materials. The shortlisted EOR additives and the respective EOR additive materials properties are generally displayed on the GUI 1070. The display on the GUI 1070 of the shortlisted EOR additives and the respective EOR additive materials properties are so that the user can adjust the scores in block 155.

The machine learning 140 and the shortlisting from block 145 are performed to establish new scores 150, i.e., the effectiveness of the EOR materials in this specific reservoir condition. These new scores are stored in the EOR DB 200 and then used in the next Machine Learning run. In this way, the system and particularly the Advisor 95, which is based on AI, is always evolving.

In block 155 a user can modify scores based on his or her experience. By modifying the scores, the user also modifies the EOR materials being used. The idea here comes from the fact that the Oil & Gas industry is a very conservative industry. Here an expert (for example, a very experienced Reservoir Engineer) could disagree with what the Advisor 95 proposed, and the expert could change the scores to deploy different EOR materials, based on his or her knowledge (basically override the Advisor 95). These new scores are stored in the EOR DB 200 and then used in the next machine learning run.

Once the Machine Learning technique ranks the shortlisted EOR materials (and the user modifies the scores in block 155), one or more signals may be sent (block 160) to a set of actuators or mixers (for example, valves) to provide the EOR material with the highest score (for example, the highest enhanced oil recovery effectiveness for the reservoir condition at that moment) to the reservoir or to mix the EOR additives together. The output for the actuators may be the EOR material(s) shortlisted with a specific concentration. More specifically, the EOR materials/concentrations can be converted into some output that would cause actuators/mixers at or near the point of injection (for example, in injection wells) to provide and use the EOR materials at their corresponding concentrations at the oil reservoir. Once the materials are mixed with water or gas, they are injected into the oil reservoir using the injection wells. If the user (for example, a reservoir engineer) chooses (see block 155) different scores for the shortlisted EOR materials selected by the machine learning, then the system can be overridden or updated to provide a new ranking.

Figure 3:
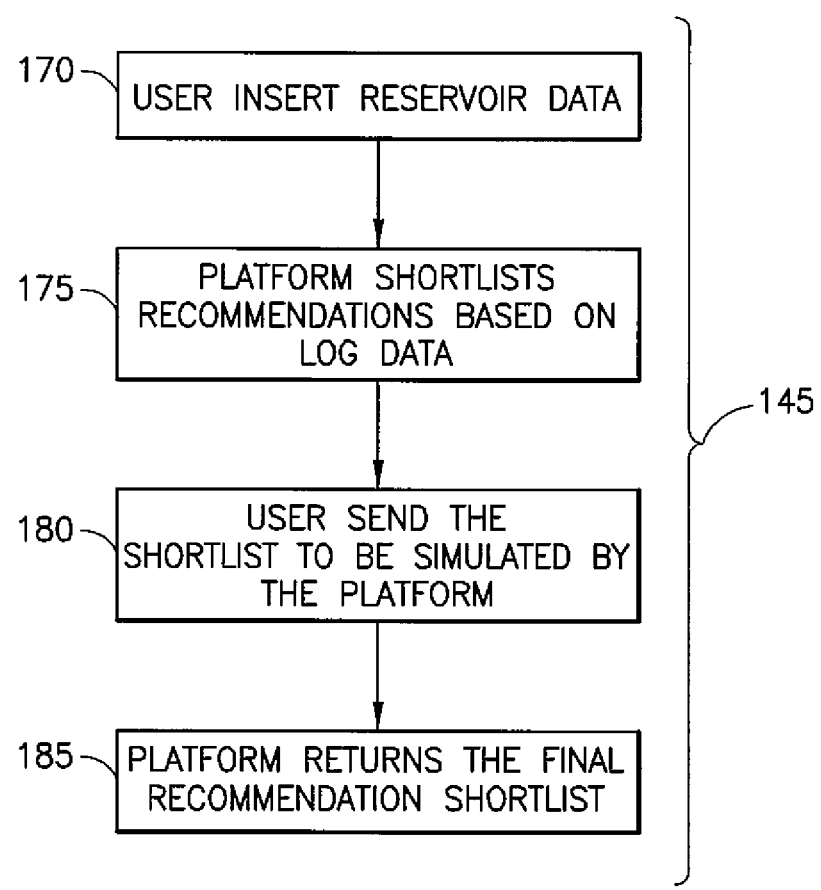
FIG. 3 is a logic flow diagram of a shortlisting process as indicated in FIG. 2A.

Referring to FIG. 3, a logic flow diagram indicating the shortlisting of block 145 is shown. In the shortlisting of block 145, the user may insert the reservoir data at block 170, and the Advisor 95 may shortlist recommendation(s) based on log data at block 175. The quality of the recommendation(s) will generally depend on the quality of the reservoir data provided. In particular, the more complete and accurate the reservoir data is, the better the recommendation(s) will be. Additionally, the quality of the recommendation(s) will generally also depend on the quality and quantity of the log data stored. From the shortlist recommendation(s) from block 175, the user may send the shortlist (block 180) to (for example) a computer for the computer simulation and/or to an output for the physical simulation, which is then returned for a final recommendation shortlist, as indicated at block 185. The shortlist may have one or more user-defined filters. For example, if the user desires a recommendation with more risk, the user-defined filters may reflect wider ranges or higher (or lower) thresholds for certain values, whereas if the user desires a more conservative output, the ranges may be narrower.

Figure 4:
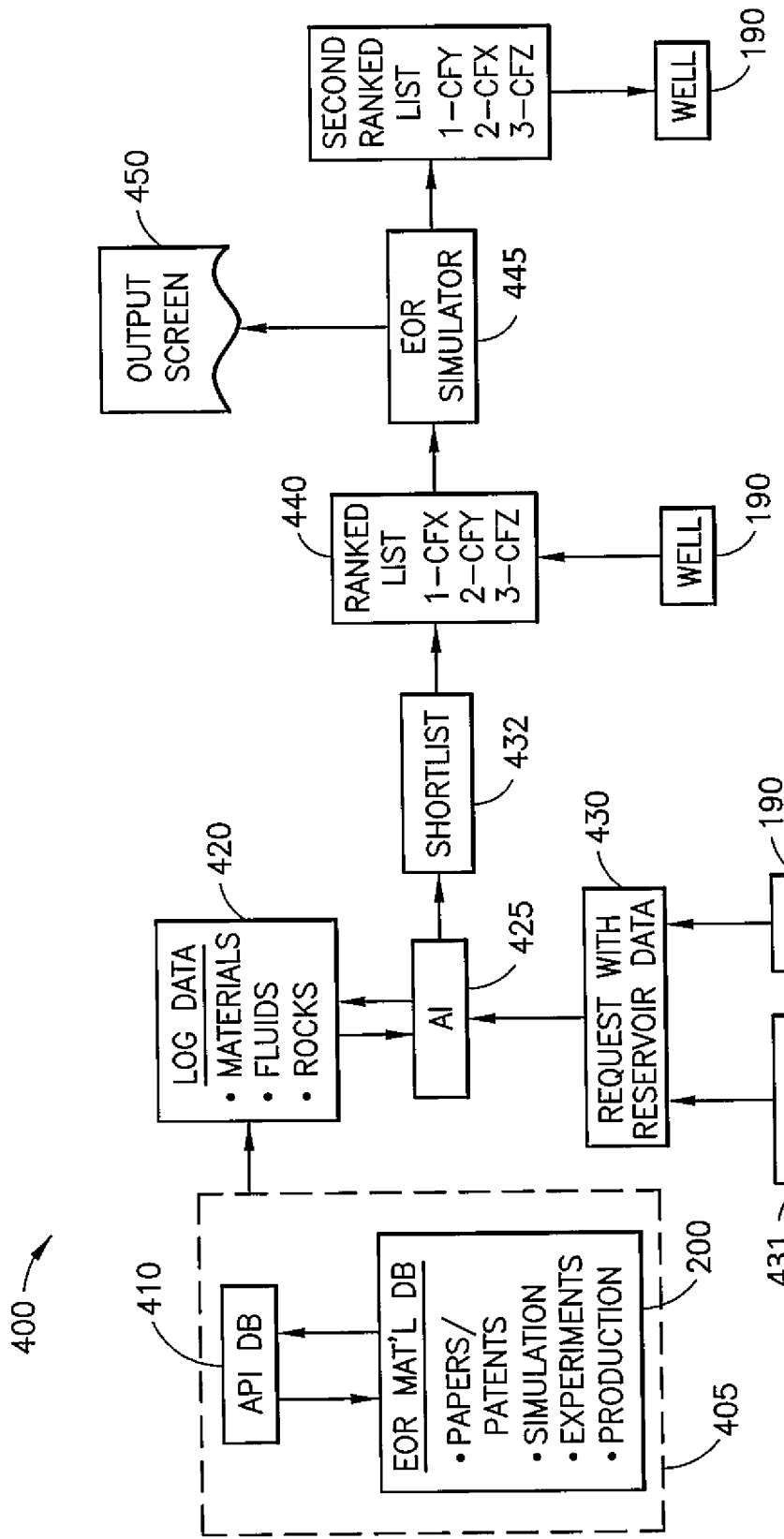
FIG. 4 is an illustration of an EOR platform, incorporating a shortlisting module, illustrating the operation of an exemplary method or methods to produce an output of ranked list(s) of materials and/or an EOR simulation.

Referring to FIG. 4, in a first exemplary embodiment, the base architecture of the EOR DB 200 and the associated system (the Advisor 95) is referred to as a Nano EOR platform and is shown generally at 400 and is hereinafter referred to as "platform 400." In the platform 400, a DB portion 405 including a materials database, such as the EOR DB 200, may communicate with and exchange information with another database via an application programming interface (API) 410. The materials database (such as the EOR DB 200) and/or the API DB 410 may encompass information pertaining to a first complex fluid, a second complex fluid, polymers, surfactants, nanoparticles, and generic material. Also included may be geological data, provenance, and EOR effectiveness.

The DB portion 405 provides log data, such as information pertaining to the materials, fluids, and rocks to a data module 420. The log data may be experimental/simulation/production log data with storage of variables indicative of the log data being in vector form. The variables are associated with the first complex fluid, the second complex fluid, any additional complex fluids, the geological data, the provenance, and the EOR effectiveness.

The log data in the data module 420 may be provided to an AI module 425, which performs the AI analyses as indicated in block 140 above, and which may also request data 430 (along with reservoir data) from, for example, user input 435 (such as data obtained from the reservoir engineer or a technician) or information directly from a well 190. The AI module 425 provides the AI analyses to a shortlist module 432, which performs the shortlisting as indicated in block 145 above.

From the AI module 425, a ranked list 440 may be output indicating a ranking of the complex fluids. For example, a first-ranked complex fluid such as the first complex fluid may be indicated as Complex Fluid X, a second-ranked complex fluid such as the second complex fluid may be indicated at Complex Fluid Y, and the like.

The ranked list 440 is displayed at a GUI (Graphical Unit Interface) and may be output directly to a well 190 or to an EOR simulator 445. If the output is to the EOR simulator 445, simulator results may be provided to the user via an output screen 450 or the like. In the alternative, the simulator results may be output as a second ranked list 443 (of Complex Fluids X, Y, and Z) and then subsequently output directly to a well 190, which may be the same or different from the first well 190.

Figure 5:
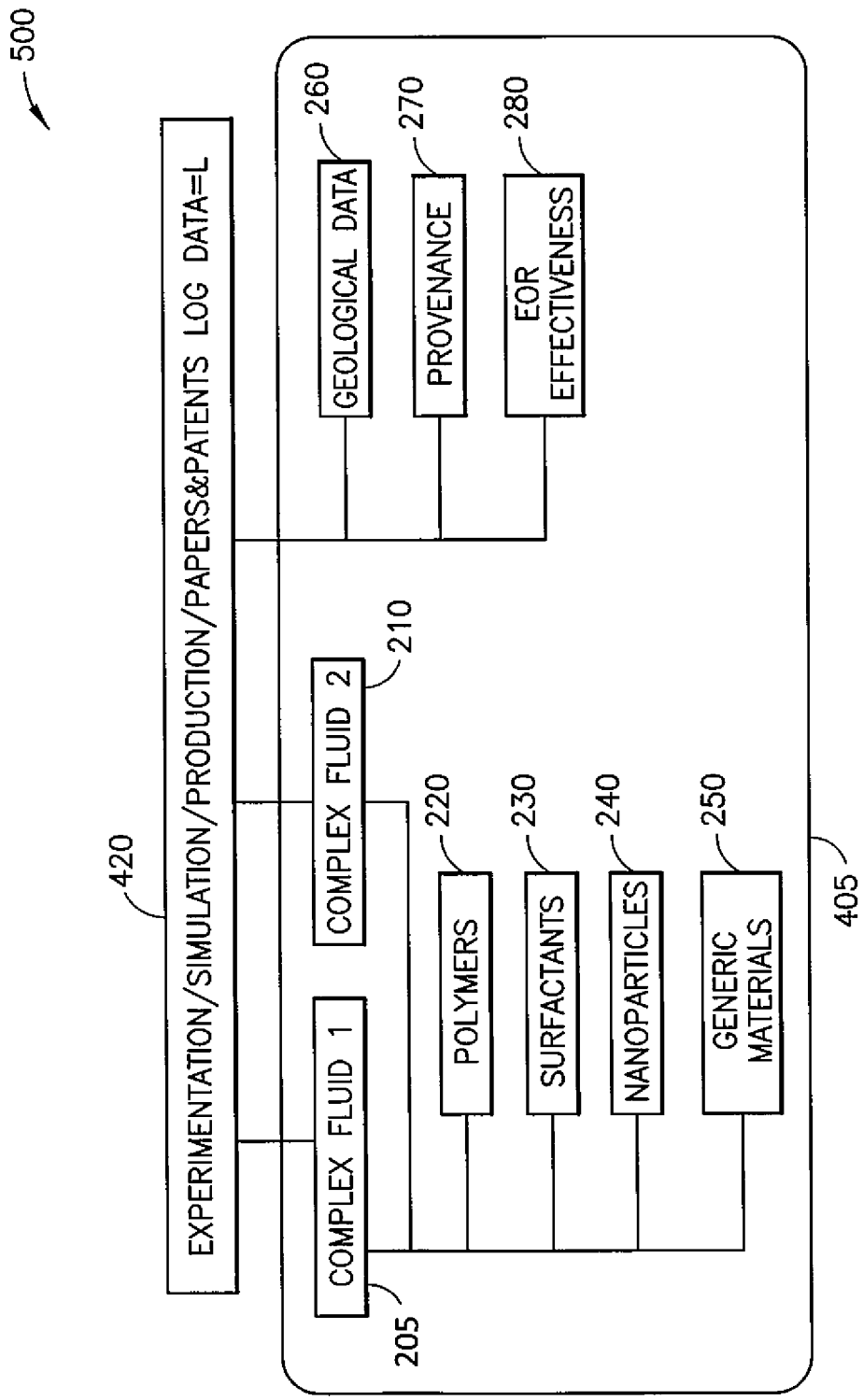
FIG. 5 is a block diagram of a possible configuration of an EOR materials database with a data module.

Referring to FIG. 5, one exemplary organization of the DB portion 405 and its association with the data module 420 is shown at 500. Information in the DB portion 405 may be found in the EOR DB 200. The DB portion 405 may include information pertaining to the first complex fluid 205, the second complex fluid 210, polymers 220, surfactants 230, nanoparticles 240, and generic materials 250. The DB portion 405 may also include geological data 260, provenance 270, and EOR effectiveness data 280.

The first complex fluid 205 may be an injection fluid, such as the fluid that will be pumped into the well with the materials for EOR. Usually this fluid includes water/brine and chemical EOR materials such as the polymers, the surfactants, the nanoparticles, and the generic materials. Possible variables in the first complex fluid 205 are temperature, viscosity, density, and the weight concentration of materials. The first complex fluid 205 can have as much material as is desired, but the sum of weight concentration of each material must be equal to 100%.

The second complex fluid 210 is the fluid which is inside the reservoir. Usually this fluid is a composition of oil, water, salts (NaCl, dications such as $Ca^{2+}$ and $Mg^{2+}$, and the like), and gas such as $CO_2$ and hydrocarbons (methane and propane).

The polymers 220 are used in polymer flooding to enhance the water viscosity in order to push oil having viscosity greater than that of water. The polymers 220 employed may be Polyacrylamide, Hydrolyzed Polyacrylamide, Hydrolyzed Polyacrylamide with some minor modifications, and Xanthan gum.

A multitude of surfactants 230 may be included in the chemical EOR. The surfactants 230 are classified according to the partial charge at the surfactant's head group in four groups: anionic, cationic, nonionic, and zwitterionic. Representative anionic surfactants used in the Oil & Gas industry include alkyl aryl sulfonates, alkyl benzene sulfonates, alkyl sulfates, n-ethoxy sulfonate, sodium dodecyl sulfate (SDS), alcohol propoxy sulfate, alkyl (or alcohol) ethoxy sulfate, alpha-olefin sulfonate, and the like. For nonionic surfactants the most representative are alkyl ethoxy carboxylated, alkyl polyglycoside, polyethoxylated alkyl phenols, poly(ethylene/propylene) glycol ether, and the like. The most common cationic surfactants are cetyl trimethyl ammonium bromide (CTAB), coco alkyl trimethyl ammonium chloride, stearyl trimethyl ammonium chloride, dodecyl trimethyl ammonium bromide (DTAB), ethoxylated alkyl amine, and the like. Zwitterionic surfactants have both cationic and anionic centers attached to the same molecule. Only recently this type of surfactant has gained attention in the oil and gas industry. At least one zwitterionic surfactant has been derived from castor oil. This bio-based surfactant generally includes a strong electrolyte tolerance, temperature resistance, and thermal stability, as well as improved wetting and foaming performance, which makes it a potential for chemical EOR.

The nanoparticles 240 usually include hydroxylated metal oxides. For example, hydroxylated metal oxide nanoparticles may be employed such as hydroxylated silicon nanoparticles, hydroxylated titanium oxide, hydroxylated magnesium oxide, hydroxylated iron oxide, hydroxylated aluminum oxide, hydroxylated manganese oxide, hydroxylated zinc oxide, and the like.

The generic materials 250 encompass all materials which do not belong to the other categories (polymers 220, surfactants 230, and nanoparticles 240). In that sense, generic materials 250 are, for example, water, oil, salt (NaCl), carbon dioxide, nitrogen, dications ($Ca^{2+}$ and $Mg^{2+}$), alkalines (NaOH), and the like.

The geological data 260 includes stored values pertaining to the rock lithology (such as sandstone, carbonate, shale), as well as the permeability, porosity, and geographical coordinates (latitude and longitude).

The provenance 270 is the source of information, for example, whether the information comes from an experiment, simulation, production data, or from literature such as from scientific papers and patents. In that sense, the user can filter and perform AI (artificial intelligence) in just one source or in both. In the latter case, the user may be asked to provide the weight of each source's contribution to the AI training. In this way, the user can control the "reliability" of AI training based on the source of data to be trained.

The EOR effectiveness 280 is the increase of oil recovery due to the use of chemical EOR.

Figure 6:
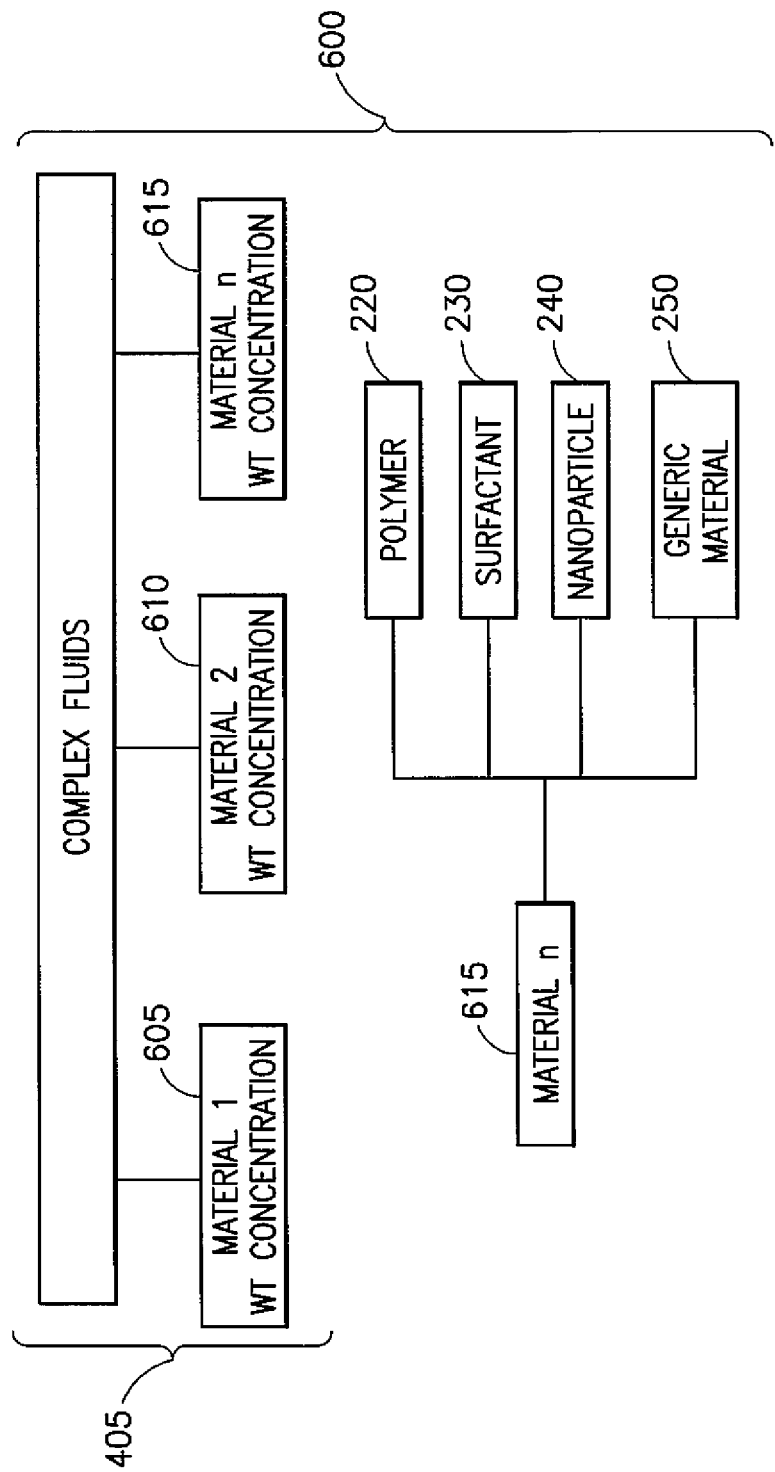
FIG. 6 is a block diagram of a possible configuration of a database defining complex fluids by material weight concentrations.

Information pertaining to the first complex fluid 205, the second complex fluid 210, the polymers 220, surfactants 230, nanoparticles 240, and generic materials 250, as well as information pertaining to the geological data 260, the provenance 270, and the EOR effectiveness 280, may be used to define the log data in the data module 420 (experimentation/simulation/production/papers and patents), which may be generally defined as:

$L = (x_{\alpha i}, \ldots, x_{\alpha k}; x_{\beta i}, \ldots, w_{\beta i}; x_{\delta i}, \ldots, x_{\delta m}; x_{\gamma}; x_{\Theta})$ Referring now to FIG. 6, another exemplary organization of the DB portion 405 is shown at 600. In particular, the complex fluids (first complex fluid 205, the second complex fluid 210, etc.) may be defined by a first material weight concentration 605, a second material weight concentration 610, and so on up to an $n^{th}$ material weight concentration 615. The $n^{th}$ material weight concentration 615 may be defined by the polymer 220, or the surfactant 230, or the nanoparticle 240, or the generic material 250.

Figure 7:
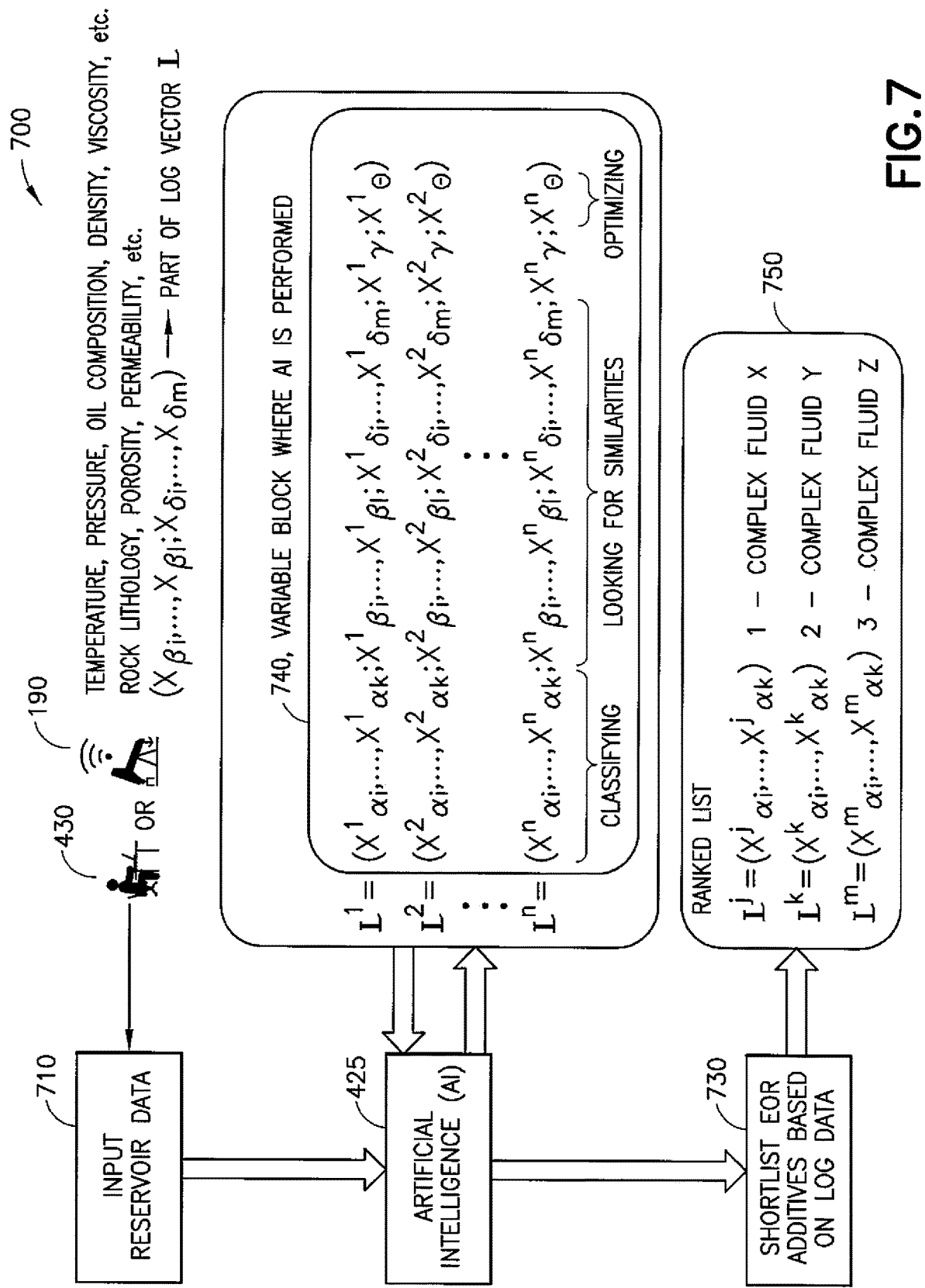
FIG. 7 is a logic flow diagram showing an AI analysis comparing complex fluids and a shortlisting process ranking the compared complex fluids.

Referring to FIG. 7, one exemplary embodiment of performing the AI is shown generally at 700. Performing the AI here facilitates the determination of the EOR additives suitable for the specific reservoir condition. In performing the AI, input reservoir data 710 is received from one or both of the engineer 431 or the well 190 and processed in the AI module 425. The processed data is then fed to a shortlist module 730.

In processing the data in the AI module 425, a plurality of log vector L values ($L_1, L_2, \ldots L_n$) are calculated in a variable block 740, with each log vector L value 420 being defined by parameters associated with the first complex fluid 205 ($x_\alpha$), the second complex fluid 210 ($x_\beta$), the geological data 260 ($x_\delta$), the provenance 270 ($x_\gamma$), and the EOR effectiveness 280 ($x_\Theta$). The parameters associated with the second complex fluid 210 ($x_\beta$) may be, for example, temperature, pressure, oil composition, density, viscosity, and the like. The parameters associated with the geological data 260 ($x_\delta$) may be, for example, rock lithology, porosity, permeability, and the like. In the processing by the AI module 425, the variable block 740 where the AI calculations are performed includes an analysis to look for similarities of the second complex fluid 210 and the geological data 260 as they relate to the first complex fluid 205 in an effort to optimize the EOR effectiveness 280, which may comprise one form of screening the EOR additives. Results of the analysis are fed back to the AI module 425.

Once the processed data is received at the shortlist module 730, a first-ranked list 750 pertaining to the first complex fluid 205 is output as $L_j$, $L_k$, $L_m$, etc.

EXAMPLE 1

In one example of a use case, a well (such as a first well 190) had state functions and oil composition of 368 K (Kelvin), a lithology of sandstone, a porosity of 40%, an oil density of 0.814 grams per cubic centimeter (g/cm³), and viscosity of 2.88 centipoise (cP). A generated complex fluid shortlist included various weight percentages of either alkyl ether sulfate or alpha olefin sulfonate for the first material and various weight percentages of either ethoxylated fatty alcohol carboxylate or amphocarboxymethyl imidazoline for the second material. A sodium salt of the alkyl ether sulfate was defined as:

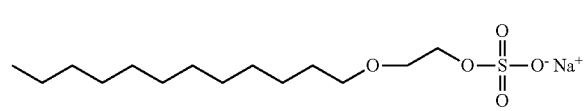

A sodium salt of the amphocarboxymethyl imidazoline was defined as:

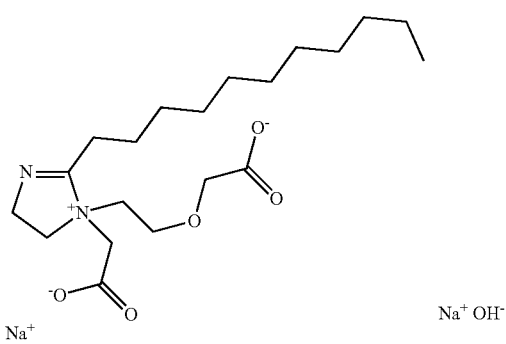

As can be seen from the data in FIG. 8, at a high risk scenario the best option (which maximizes the oil recovery) is 0.250 weight % of alpha olefin sulfonate and 0.750 wt % of ethoxylated fatty alcohol carboxylate. At a low risk scenario, the best option (which maximizes the similarity with the oil reservoir represented here as the porosity parameter) is 0.125 wt % of alpha olefin sulfonate and 0.375 wt % of ethoxylated fatty alcohol carboxylate. The numbers "1, 2 and 3" at the columns "high risk" and "low risk" mean the first, the second and the third best options at high and low risk scenarios.

EXAMPLE 2

In another example of a use case, a well (such as a second well 190) had state functions and oil composition of 298 K, a lithology of sandstone, a porosity of 30%, an oil density of 0.830 g/cm³, and viscosity of 12 cP. A generated complex fluid shortlist included various weight percentages of polyacrylamide as the first material, various weight percentages of sodium dodecyl sulfate as the second material, various weight percentages of lignosulfonates as the third material, and various weight percentages of tallow amine as the fourth material. The polyacrylamide was defined as:

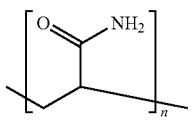

The lignosulfonates were defined as:

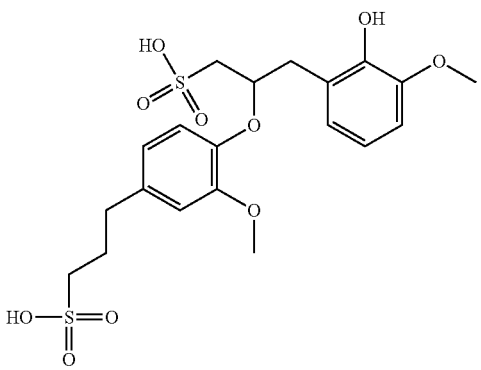 [SMILES: COc1cc(CCCS(=O)(=O)O)ccc1OC(Cc1cccc(OC)c1O)CS(=O)(=O)O]

The sodium dodecyl sulfate was defined as:

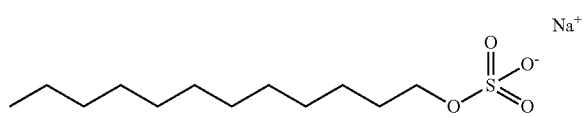 [SMILES: [Na+] ; CCCCCCCCCCCCOS(=O)(=O)[O-]]

As can be seen at FIG. 9, at the high risk scenario the best option (which maximizes the oil recovery) is 0.14 wt % of polyacrylamide, 1.3 wt % of sodium dodecyl sulfate, 0.441 wt % of lignosulfonate and 0.259 wt % of tallow amine. At a low risk scenario the best option (which maximizes the similarity with the oil reservoir) is the complex fluid composed by 0.14 wt % of polyacrylamide and 2.0 wt % of sodium dodecyl sulfate. The numbers "1, 2 and 3" at the columns "high risk" and "low risk" means the first, the second and the third best options at high and low risk scenarios.

In one example, a method comprises: performing a machine learning process using one or more sources of information for enhanced oil recovery (EOR) materials to be used for an EOR process on a defined oil reservoir; determining one or more EOR materials suitable for a specific condition of the defined oil reservoir; listing the one or more EOR materials suitable for the specific condition; and outputting an indication of the one or more EOR materials and their corresponding concentrations to be used in the EOR process. The EOR materials comprise a first complex fluid to be introduced into the defined oil reservoir. Determining the one or more EOR materials suitable for the specific condition is based on similarities between a first set of vector values for the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

The method may further comprise converting the indication of the one or more EOR materials and their corresponding concentrations to be used in the EOR process into information defined to cause one or more actuators or one or more mixers or both to provide the one or more EOR materials at their corresponding concentrations at the defined oil reservoir for use by the EOR process. The method may further comprise allowing a user to modify EOR efficiencies associated with the EOR materials from the listing of the one or more EOR materials suitable for the specific condition. The first complex fluid may be an injection fluid to be injected into the defined oil reservoir and may comprise one or more of a water, brine, polymer, surfactant, and nanoparticles, and the second complex fluid may comprise one or more of oil, water, salts, and gas. Determining the one or more EOR materials suitable for the specific condition may be further based on geological data. Performing a machine learning process using one or more sources of information for EOR materials may comprise obtaining information from a database. Obtaining information from a database further may comprise obtaining provenance information from one or more of an experiment, a simulation, production data, scientific papers, and patents. The method may further comprise running a simulation based on the outputted indication of the one or more EOR materials and their corresponding concentrations to be used in the EOR process. Outputting an indication of the one or more EOR materials and their corresponding concentrations to be used in the EOR process may comprise displaying the indication and the corresponding concentration on a graphical user interface.

In another example, a computer system comprises: one or more memories having computer readable code; one or more processors, where the one or more processors, in response to retrieving and executing the computer readable code, cause the computer system to perform the following: performing a machine learning process using one or more sources of information for enhanced oil recovery (EOR) materials to be used for an EOR process on a defined oil reservoir; determining one or more EOR materials suitable for a specific condition of the defined oil reservoir; listing the one or more EOR materials suitable for the specific condition; and outputting an indication of the one or more EOR materials and their corresponding concentrations to be used in the EOR process. The EOR materials comprise a first complex fluid to be introduced into the defined oil reservoir. Determining the one or more EOR materials suitable for the specific condition is based on similarities between a first set of vector values comprising the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

In the computer system, one or more processors, in response to retrieving and executing the computer readable code, may cause the computer system to perform the following: converting the indication of the one or more EOR materials and their corresponding concentrations to be used in the EOR process into information defined to cause one or more actuators or one or more mixers or both to provide the one or more EOR materials at their corresponding concentrations at the defined oil reservoir for use by the EOR process. The one or more processors, in response to retrieving and executing the computer readable code, may cause the computer system, to perform the following: allowing a user to modify EOR efficiencies associated with the EOR materials from the listing of the one or more EOR materials suitable for the specific condition. The one or more processors, in response to retrieving and executing the computer readable code, may cause the computer system to obtain information from a database. Causing the computer system to obtain information from a database may further comprise causing the computer system to obtain provenance information from one or more of an experiment, a simulation, production data, scientific papers, and patents. The one or more processors, in response to retrieving and executing the computer readable code, may cause the computer system to perform the following: searching a world-wide web for EOR materials; assigning properties to EOR materials found during the searching; establishing reservoir parameters; establishing effectiveness of EOR materials based on the reservoir parameters, the EOR materials found for each of the multiple options, and the properties of the EOR materials found for each of the multiple options; and defining, based on the established effectiveness, EOR efficiencies for the EOR materials, each EOR efficiency proportional to an incremental oil production after the EOR process is employed using a corresponding EOR material for a reservoir with the established reservoir parameters. The one or more processors, in response to retrieving and executing the computer readable code, may cause the computer system to perform the following: defining a concentration for each component of the first complex fluid; assigning properties to the first complex fluid; defining fluid properties of the second complex fluid; defining physical, chemical, and topological parameters of rock associated with the defined oil reservoir; establishing an effectiveness of the first complex fluid relative to the second complex fluid; and defining, based on the established effectiveness, EOR efficiencies for the first complex fluid, each EOR efficiency proportional to an incremental oil production after the EOR process is employed using a corresponding first complex fluid for a reservoir with the established reservoir parameters. The defined oil reservoir may be defined based on information comprising physical and chemical conditions at the oil reservoir. The first complex fluid may be an injection fluid to be injected into the defined oil reservoir and may comprise one or more of a water, brine, polymer, surfactant, and nanoparticles, and the second complex fluid may comprise one or more of oil, water, salts, and gas. Determining the one or more EOR materials suitable for the specific condition may be further based on geological data.

In another example, a computer program product comprises a computer readable storage medium having program instructions embodied therewith, the program instructions executable by a computer system to cause the computer system to perform operations comprising: performing a machine learning process using one or more sources of information for enhanced oil recovery (EOR) materials to be used for an EOR process on a defined oil reservoir; determining one or more EOR materials suitable for a specific condition of the defined oil reservoir; listing the one or more EOR materials suitable for the specific condition; and outputting an indication of the one or more EOR materials and their corresponding concentrations to be used in the EOR process. The EOR materials comprise a first complex fluid to be introduced into the defined oil reservoir. Determining the one or more EOR materials suitable for the specific condition is based on similarities between a first set of vector values comprising the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

In the foregoing description, numerous specific details are set forth, such as particular structures, components, materials, dimensions, processing steps, and techniques, in order to provide a thorough understanding of the exemplary embodiments disclosed herein. However, it will be appreciated by one of ordinary skill of the art that the exemplary embodiments disclosed herein may be practiced without these specific details. Additionally, details of well-known structures or processing steps may have been omitted or may have not been described in order to avoid obscuring the presented embodiments. It will be understood that when an element as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

The description of the present invention has been presented for purposes of illustration and description, but is not intended to be exhaustive or limiting in the form disclosed. Many modifications and variations will be apparent to those of ordinary skill in the art without departing from the scope of the invention. The embodiments were chosen and described in order to best explain the principles of the invention and the practical applications, and to enable others of ordinary skill in the art to understand the invention for various embodiments with various modifications as are suited to the particular uses contemplated.

The following abbreviations that may be found in the specification and/or the drawing figures are defined as follows;

AI artificial intelligence
API application programming interface
ASP alkaline, surfactant, and polymer
DB database
EOR enhanced oil recovery
GUI graphic user interface
IE information extraction
ML machine learning
OOIP original-oil-in-place
WWW world wide web

What is claimed is:

1. A method, comprising:
performing a machine learning process using one or more sources of information for enhanced oil recovery (EOR) materials to be used for an EOR process on a defined oil reservoir;
determining one or more EOR materials suitable for a specific condition of the defined oil reservoir;
listing the one or more EOR materials suitable for the specific condition; and
outputting an indication of the one or more EOR materials and their corresponding concentrations to be used in the EOR process;
where the EOR materials comprise a first complex fluid to be introduced into the defined oil reservoir; and
where determining the one or more EOR materials suitable for the specific condition is based on similarities between a first set of vector values for the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

2. The method of claim 1, further comprising converting the indication of the one or more EOR materials and their corresponding concentrations to be used in the EOR process into information defined to cause one or more actuators or one or more mixers or both to provide the one or more EOR materials at their corresponding concentrations at the defined oil reservoir for use by the EOR process.

3. The method of claim 1, further comprising allowing a user to modify EOR efficiencies associated with the EOR materials from the listing of the one or more EOR materials suitable for the specific condition.

4. The method of claim 1, where the first complex fluid is an injection fluid to be injected into the defined oil reservoir and comprises one or more of a water, brine, polymer, surfactant, and nanoparticles, and the second complex fluid comprises one or more of oil, water, salts, and gas.

5. The method of claim 4, where determining the one or more EOR materials suitable for the specific condition is further based on geological data.

6. The method of claim 1, where performing a machine learning process using one or more sources of information for EOR materials comprises obtaining information from a database.

7. The method of claim 6, where obtaining information from a database further comprises obtaining provenance information from one or more of an experiment, a simulation, production data, scientific papers, and patents.

8. The method of claim 1, further comprising running a simulation based on the outputted indication of the one or more EOR materials and their corresponding concentrations to be used in the EOR process.

9. The method of claim 1, where outputting an indication of the one or more EOR materials and their corresponding concentrations to be used in the EOR process comprises displaying the indication and the corresponding concentration on a graphical user interface.

10. A computer system, comprising:
one or more memories having computer readable code;
one or more processors, where the one or more processors, in response to retrieving and executing the computer readable code, cause the computer system to perform the following:
performing a machine learning process using one or more sources of information for enhanced oil recovery (EOR) materials to be used for an EOR process on a defined oil reservoir;
determining one or more EOR materials suitable for a specific condition of the defined oil reservoir;
listing the one or more EOR materials suitable for the specific condition; and
outputting an indication of the one or more EOR materials and their corresponding concentrations to be used in the EOR process;
where the EOR materials comprise a first complex fluid to be introduced into the defined oil reservoir; and
where determining the one or more EOR materials suitable for the specific condition is based on similarities between a first set of vector values comprising the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

11. The computer system of claim 10, where the one or more processors, in response to retrieving and executing the computer readable code, cause the computer system to perform the following: converting the indication of the one or more EOR materials and their corresponding concentrations to be used in the EOR process into information defined to cause one or more actuators or one or more mixers or both to provide the one or more EOR materials at their corresponding concentrations at the defined oil reservoir for use by the EOR process.

12. The computer system of claim 10, where the one or more processors, in response to retrieving and executing the computer readable code, cause the computer system to perform the following: allowing a user to modify EOR efficiencies associated with the EOR materials from the listing of the one or more EOR materials suitable for the specific condition.

13. The computer system of claim 10, where the one or more processors, in response to retrieving and executing the computer readable code, cause the computer system to obtain information from a database.

14. The computer system of claim 13, where causing the computer system to obtain information from a database further comprises causing the computer system to obtain provenance information from one or more of an experiment, a simulation, production data, scientific papers, and patents.

15. The computer system of claim 10, where the one or more processors, in response to retrieving and executing the computer readable code, cause the computer system to perform the following:
  searching a world-wide web for EOR materials;
  assigning properties to EOR materials found during the searching;
  establishing reservoir parameters;
  establishing effectiveness of EOR materials based on the reservoir parameters, the EOR materials found for each of multiple options, and the properties of the EOR materials found for each of the multiple options; and
  defining, based on the established effectiveness, EOR efficiencies for the EOR materials, each EOR efficiency proportional to an incremental oil production after the EOR process is employed using a corresponding EOR material for a reservoir with the established reservoir parameters.

16. The computer system of claim 10, where the one or more processors, in response to retrieving and executing the computer readable code, cause the computer system to perform the following:
  defining a concentration for each component of the first complex fluid;
  assigning properties to the first complex fluid;
  defining fluid properties of the second complex fluid;
  defining physical, chemical, and topological parameters of rock associated with the defined oil reservoir;
  establishing an effectiveness of the first complex fluid relative to the second complex fluid; and
  defining, based on the established effectiveness, EOR efficiencies for the first complex fluid, each EOR efficiency proportional to an incremental oil production after the EOR process is employed using a corresponding first complex fluid for a reservoir with the established reservoir parameters.

17. The computer system of claim 10, where the defined oil reservoir is defined based on information comprising physical and chemical conditions at the oil reservoir.

18. The computer system of claim 10, where the first complex fluid is an injection fluid to be injected into the defined oil reservoir and comprises one or more of a water, brine, polymer, surfactant, and nanoparticles, and the second complex fluid comprises one or more of oil, water, salts, and gas.

19. The computer system of claim 10, where determining the one or more EOR materials suitable for the specific condition is further based on geological data.

20. A computer program product comprising a computer readable storage medium having program instructions embodied therewith, the program instructions executable by a computer system to cause the computer system to perform operations comprising:
  performing a machine learning process using one or more sources of information for enhanced oil recovery (EOR) materials to be used for an EOR process on a defined oil reservoir;
  determining one or more EOR materials suitable for a specific condition of the defined oil reservoir;
  listing the one or more EOR materials suitable for the specific condition; and
  outputting an indication of the one or more EOR materials and their corresponding concentrations to be used in the EOR process;
  where the EOR materials comprise a first complex fluid to be introduced into the defined oil reservoir; and
  where determining the one or more EOR materials suitable for the specific condition is based on similarities between a first set of vector values comprising the first complex fluid, at least one second set of vector values for a second complex fluid already in the defined oil reservoir, and geological data, each of the vector values of the first set being defined by parameters associated with the first complex fluid and each of the vector values of the second set being defined by parameters of the second complex fluid and the geological data.

* * * * *